United States Patent [19]

Neufang

[11] 4,037,054
[45] July 19, 1977

[54] CIRCUIT ARRANGEMENT FOR MONITORING PCM COUPLERS

[75] Inventor: Karlheinz Neufang, Munich, Germany

[73] Assignee: Siemens Aktiengesellschaft, Munich, Germany

[21] Appl. No.: 552,000

[22] Filed: Feb. 21, 1975

Related U.S. Application Data

[63] Continuation of Ser. No. 464,859, April 29, 1974, abandoned, which is a continuation of Ser. No. 218,990, Jan. 19, 1972, abandoned.

[30] Foreign Application Priority Data

Jan. 19, 1971   Germany .............................. 2102371

[51] Int. Cl.² ............................................. H04J 3/14
[52] U.S. Cl. ............................................ 179/15 BF
[58] Field of Search ......... 179/15 AT, 15 BF, 18 ES, 179/18 FC, 18 J, 22, 175.3 S, 175.2 R; 340/147 SC, 146.1 BE, 146.2; 178/79 R; 325/56

[56] References Cited

U.S. PATENT DOCUMENTS

| | | | |
|---|---|---|---|
| 2,986,602 | 5/1961 | Tubinis | 179/15 AL |
| 3,060,273 | 10/1962 | Nowak et al. | 179/175.2 R |
| 3,395,254 | 7/1968 | Sweet | 179/18 BC |
| 3,518,549 | 6/1970 | Sarati | 340/147 SC |
| 3,542,970 | 11/1970 | Westfall | 179/22 |
| 3,603,736 | 9/1971 | Morrell | 179/175.3 S |
| 3,624,372 | 11/1971 | Philip | 340/146.1 BE |
| 3,760,115 | 9/1973 | Duerdoth | 179/15 BF |
| 3,775,565 | 11/1975 | Ruthonski | 179/18 ES |
| 3,886,318 | 5/1975 | Charransol | 179/15 BF |
| 3,892,923 | 7/1975 | Runner | 179/15 BF |

*Primary Examiner*—Kathleen H. Claffy
*Assistant Examiner*—E. S. Kemeny
*Attorney, Agent, or Firm*—Gerald L. Lett

[57] ABSTRACT

In an exchange of a telecommunication network, which operates according to pulse code modulation (PCM) techniques, a circuit arrangement is described for monitoring the performance of a plurality of PCM couplers. The incoming and outgoing lines for the exchange are connected to the couplers, and the couplers are interconnected. An additional coupler is provided, and the input thereof is connected to the inputs of each of the other PCM couplers. The outputs of the additional coupler and the other couplers are connected, respectively, to inputs of a comparator which produces an error signal output. The error signal is used as the basis for determining whether the tested couplers are operating properly. Central control apparatus connects the additional coupler as a test unit or as a substitute for a defective coupler.

6 Claims, 1 Drawing Figure

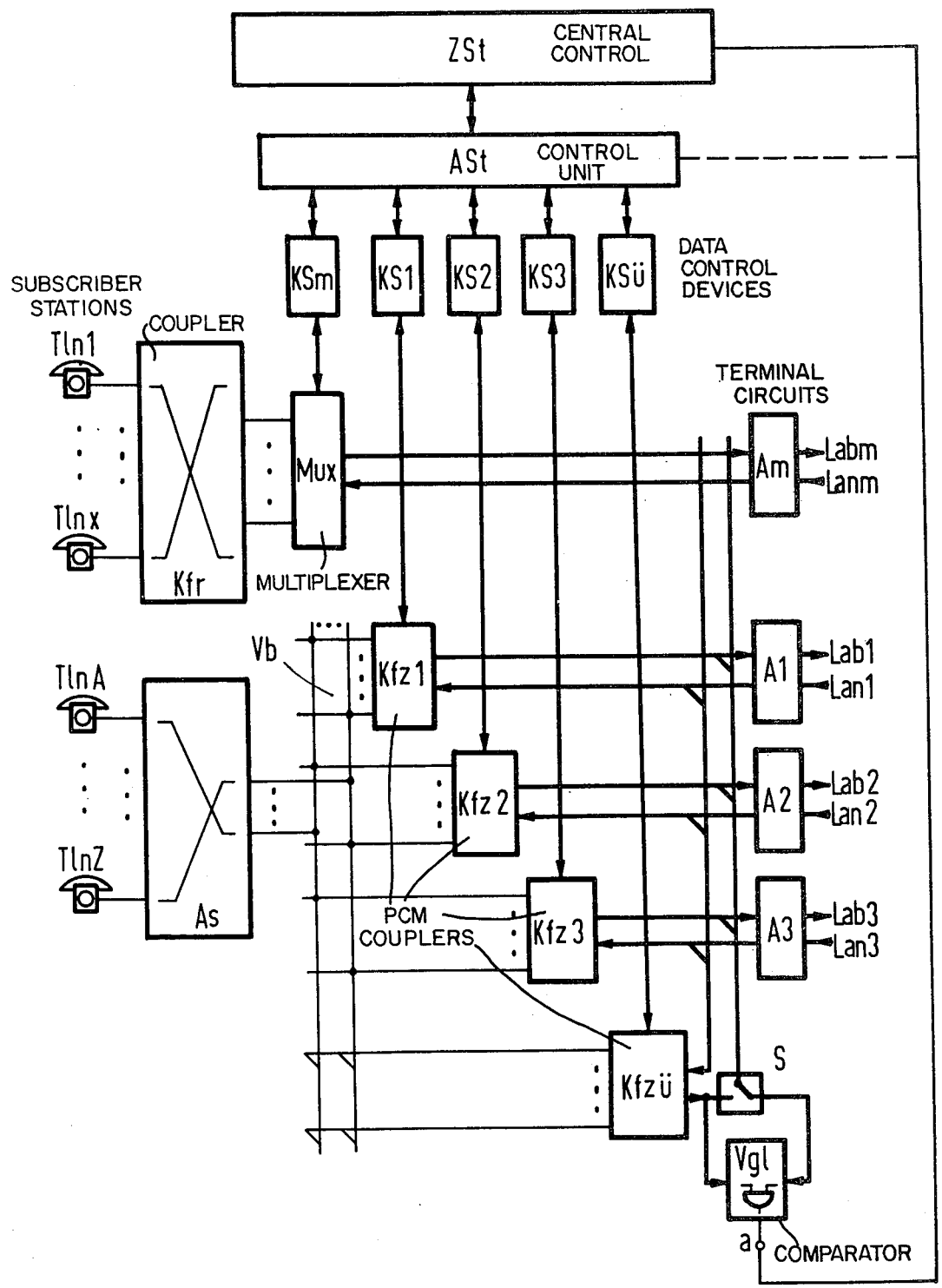

CIRCUIT ARRANGEMENT FOR MONITORING PCM COUPLERS

This is a continuation of application Ser. No. 464,859, filed Apr. 29, 1974, now abandoned, which is a continuation of application Ser. No. 218,990, filed Jan. 19, 1972, now abandoned.

BACKGROUND OF THE INVENTION

In exchanges of a telecommunication network which transmits and receives pulse code modulated signals (PCM), it is necessary to transmit the PCM signals to or from other exchanges by means of particularly adapted apparatus including a coupler. It is a known practive (see "Informationen Fernsprech-Vermittlungstechnik" 5, 1969, No. 1, pages 48–59) to allocate a PCM coupler to the PCM lines entering and leaving a PCM exchange. Each PCM coupler may also be allocated to a plurality of incoming and outgoing lines, the individual couplers in such case being interconnected via a separate connecting coupling field (see "Fernmeldetechnik" 9, 1969, No. 5, pages 147–152).

To check the operational reliability of a PCM coupler, a commonly used technique (see West German Pat. No. P 20 32 363.1) is to transmit a check word to an incoming PCM line within each pulse frame of the incoming PCM lines. That is, the check word occurs each time in the course of the duration of a specific time division, and each time on an outgoing PCM line of the PCM coupler when the latter functions properly. It is likewise conventional, in monitoring adjusting devices for adjusting coupling-point switches of a PCM coupler, to write monitoring codes into separate pairs of leads intermediate relay banks associated with adjoining exchanges in the course of the duration of the time slots of communications of non-assignable time channels (see West German Pat. No. P 20 48 115.6). The monitoring codes are compared with control signals which are generated by an interoffice timing generator at corresponding instants within the respective fixed pulse frame. If the signals that are being compared with each other do not coincide, error-detecting signals are generated which can be employed for correcting errors.

These known solutions for monitoring a PCM coupler require complex and expensive special apparatus which, to a large extent, can only be utilized for the monitoring operation itself.

It is, therefore, an object of this invention to provide means for monitoring the operational reliability of PCM couplers without the use of elaborate equipment.

SUMMARY OF THE INVENTION

The aforementioned and other objects are achieved by this invention which provides for at least one additional PCM coupler, whose inputs can be connected to the inputs of each of the other PCM couplers, in the exchange. To the outputs of the additional PCM coupler, as well as to the corresponding outputs of each of the operating PCM couplers, there can be connected a comparing unit, by means of which the PCM signals transmitted via corresponding coupling paths to the two PCM couplers are compared with each other. When a deviation is detected between the PCM signals which are being compared with each other, the comparing unit transmits an error-detecting signal to an evaluating apparatus.

An advantage of this system over the prior art solutions above mentioned is that the operational reliability of the PCM couplers in question can be monitored with comparatively little circuitry.

According to a preferred embodiment of the invention, the evaluating circuit, upon receiving an error signal, induces the disablement of the tested PCM coupler. Thus, a comparatively simple method is provided for avoiding errors in PCM connections caused by defective PCM couplers. It is to be noted that the additional PCM coupler is presumed to be functioning properly.

According to another preferred embodiment of the invention, instead of the disabled coupler above mentioned, the additional PCM coupler is utilized for connecting through PCM signals, after an error has been noted. Thus, the additional PCM coupler performs an additional function which is of particular advantage, considering the required amount of circuitry.

BRIEF DESCRIPTION OF THE DRAWING

The principles of this invention will be more readily understood by reference to a description of a preferred embodiment constructed according to these principles given hereinbelow in conjunction with the drawing. The single FIGURE of the drawing diagrammatically illustrates pertinent portions of a telecommunication exchange installation constructed and arranged according to the invention.

DETAILED DESCRIPTION OF THE DRAWING

In the exchange in the FIGURE, subscriber stations Tln1 to Tlnx are interconnected via a coupler Kfr of known construction which operates in accordance with the space division multiplex principle. Each subscriber's station may be connected via the coupler Kfr and a multiplexer Mux connected at the outgoing end thereof to at least one other exchange of the telecommunication network. The subscriber stations Tln1 to Tlnx transmit communication signals as low frequency signals; they likewise, receive NF low frequency signals. The coupler Kfr processes said low frequency signals, which are converted in the multiplexer Mux into PCM signals and are then transmitted to the respective exchange of adjoining exchanges. In like manner, the multiplexer Mux converts into low frequency signals the PCM signals supplied thereto from adjoining exchanges, and the converted signals then transmitted to the coupler Kfr.

On the junction or output side of the multiplexer Mux, through which the exchange is connected to other exchanges, there is provided a matching circuit Am, of known construction, which serves here as a line termination circuit for the transmission lines going to or leaving the exchange. These transmission lines are PCM lines, to which the individual communication signals are transferred in pulse-code-modulated form. It is further to be noted that extending from the matching circuit Am there are shown an outgoing PCM line Labm and an incoming PCM line Lanm. However, each line may represent the combination of a plurality of corresponding PCM lines.

In addition to the multiplexer Mux above discussed, which represents a communication signal receiving and transmitting apparatus, the circuit arangement shown in the drawing includes a series of PCM couplers or junctor gates each being a signal receiving/transmitting device of known construction; namely, the PCM couplers Kfz1, Kfz2 and Kfz3. An example of such known couplers or junctors is to be found in U.S. Pat. No. 2,957,949, wherein the details of the construction of "junctor crosspoints" is given in connection with FIG. 17. The described construction would be suitable for use with the embodiment described herein. In addition reference may be had to U.S. Pat. No. 3,395,254, and in particular to the description of the junctor gates given therein. Each of these couplers is linked, via a terminal circuit A1, A2 or A3 in the exchange in question to adjoining exchanges via PCM lines. In the case of the PCM coupler K$fz$1, the PCM lines are identified as L$ab$1, and L$an$1, in the case of the PCM coupler K$fz$and 2 L$ab$2 and L$an$2, and in the case of the PCM coupler K$fz$3 as L$ab$3 and L$an$3. Here, too, each of the incoming or outgoing PCM lines may denote a series of corresponding combined PCM lines.

The PCM couplers K$fz$1, and K$fz$3 shown in the drawing are interconnected via a separate PCM connecting coupling field V$b$, to which can be linked a PCM connecting circuit As of known construction, as illustrated in the drawing. To said PCM connecting circuit As can be connected the subscriber's stations T$ln$A to T$ln$z which can receive or transmit communication signals as PCM signals. The PCM signals are supplied to the individual subscriber's stations T$ln$A to T$ln$Z via the PCM couplers or transmitted thereto from the respective subscriber's stations. The PCM couplers K$fz$1 to K$fz$3 can transmit PCM signals supplied thereto via one of the said PCM lines to each of the other PCM couplers. In this case, the respective exchange serves as a transit exchange in the course of construction of a PCM connection.

With reference to the PCM couplers illustrated in the drawing, it is to be noted that they denote a plurality of incoming and outgoing PCM lines. In like manner, the coupling field V$b$ has a plurality of junction lines over which the respective PCM couplers are connected to each other and wired to the PCM terminal circuit As.

The circuit arrangement illustrated in the drawing has at least one additional PCM coupler K$fz$u which can be coupled in parallel to each of the other PCM couplers K$fz$1, K$fz$2 and K$fz$3. This is indicated in the drawing by interconnecting corresponding crossing lines with a slanting connecting line.

A comparator or comparing unit V$g$1 can be coupled to the individual PCM couplers K$fz$1, K$fz$2, K$fz$3 and to the additional PCM coupler K$fz$u above mentioned. Any known form of comparator circuit will suffice, and a simple voltage comparator may be used. The comparing unit V$g$1 can be connected at its inputs to corresponding outputs of one of the PCM couplers K$fz$1, K$fz$2 K$fz$3 and of the additional PCM coupler K$fz$u, respectively. This is effected via the switch S, which must be in the position illustrated in the drawing. This capability of being connected is indicated in the drawing by slanting connecting lines which link the respective junction lines.

In the comparing unit V$g$1 are compared corresponding PCM signals appearing at the outputs of the PCM couplers connected thereto. This is achieved by coupling the input of PCM coupler K$fz$u to the input of one of the PCM couplers K$fz$1 to K$fz$3. If the comparing unit V$g$1, during the comparative measurement, detects a deviation between the PCM signals which are being compared with each other, it generates a signal from its output a for transmission to central control unit ZS$t$, which is illustrated only diagrammatically, or to the control unit AS$t$ connected thereto. In view of the fact that an otherwise conventional centrally controlled exchange is involved the control unit AS$t$ and the central control or computer ZS$t$ are known in the prior art and will not be described further herein. However, the details of the construction of a suitable central control arrangement which might be used herein will be found in the above cited U.S. Pat. No. 3,395,254. The control unit AS$t$ is fully described in commonly assigned U.S. Pat. No. 3,775,565, and in addition the relationship between the control unit and the central control is described in the aforementioned patent.

The error signal is measured by means not illustrated herein to determine whether the coupler being tested is defective. Such a measurement may be accomplished by simple voltage measuring means of any known type, and this measurement is utilized by the central control to switch couplers, as necessary. It is to be noted that the additional PCM coupler K$fz$u is presumed to be a PCM coupler free from defects. To that end, the respective additional PCM coupler K$fz$u can be equipped with separate monitoring and, when necessary, alternate switching elements provided only therefor.

If during a comparative measurement, as above discussed, an error signal is transmitted from the output a of the comparing unit V$g$1, the PCM coupler of the PCM couplers K$fz$1, K$fz$2, K$fz$3 which is evaluated as defective, is disabled. Instead of the now inoperative PCM coupler, the additional PCM coupler K$fz$u is now enabled to connect through the junction traffic which has heretofore been connected through via the now inoperative PCM coupler. To that end, the switch S must be set in the position other than the one indicated in the drawing.

To each of the communication signal receiving/transmitting devices formed by the multiplexer Mux, as well as by the PCM couplers K$fz$1, K$fz$2, K$fz$3 and K$fz$u, is allocated, through connecting lines, a separate data receiving/transmitting device KS$m$, KS1, KS2, KS3 or KS$u$. A more detailed description of the structures and connections of the multiplexer and switching equipment will be found in the U.S. Pat. No. 2,986,602, wherein the multiplexer is identified as the element MT50 and the switching equipment is identified by the numeral 21. These data receiving/transmitting devices, with the communication signal receiving/transmitting devices associated therewith, are capable of exchanging information concerning the respective communication, and particularly switching characteristics. The switching data receiving/transmitting devices are in communication with the control unit AS$t$ which, upon receiving data signals from a receiving/transmitting device, particularly formed by switching signals, controls each desired operations for the communication. Moreover, the control unit AS$t$ transmit to each data receiving/transmitting device data signals for a communication between subscriber stations and these are then supplied by the control unit AS$t$ via a data receiving/transmitting device to the communication signal receiving/transmitting device connected therewith, so as to be introduced therein into the information signal flow, i.e., the speech signal flow.

The control unit AS$t$ above mentioned is connected directly through connecting lines to the central control unit ZS$t$ above described, which is capable by means of the control unit AS$t$ of controlling operations to be performed in each exchange, i.e., operations relating to the establishing and the releasing of connections between subscriber stations AS$t$.

Although certain preferred embodiments of the invention have been disclosed for purposes of illustrations, it will be evident that various changes and modifications may be made therein without departing from the scope and spirit of the invention.

I claim:

1. In an exchange installation of a telecommunication system which operates according to pulse modulation (PCM) techniques, said exchange having a plurality of PCM couplers to which are assigned incoming and outgoing transmission lines for the exchange, said PCM couplers being interconnected such that signals can be interchanged between couplers, a circuit arrangement for monitoring said plurality of couplers comprising:
    at least one additional PCM coupler having inputs connected to the inputs to said plurality of couplers,
    comparator means having inputs connected, respectively, to the output of said additional coupler and to the outputs of the plurality of couplers for producing an error signal indicative of the differences between the signals produced by said additional coupler and said plurality of couplers and
    means for measuring said error signal and determining the condition of said plurality of couplers from said measurement.

2. The circuit arrangement defined in claim 1 wherein said plurality of couplers are connected individually to said comparator means and wherein said means for measuring includes means for disabling the one of said plurality of couplers when said error signal reaches a predetermined level.

3. The circuit arrangement defined in claim 2 wherein said disabling means includes means for substituting said additional coupler for said disabled coupler.

4. In an exchange installation of a telecommunication network, which operates according to pulse code modulation (PCM) techniques, said exchange having a plurality of PCM couplers to which are coupled incoming and outgoing transmission lines for said exchange, said PCM couplers being interconnected such that signals can be interchanged between couplers, a method for monitoring the performance of said plurality of couplers comprising the steps of:
    coupling the inputs of said plurality of couplers to the input of an additional coupler,
    comparing the outputs from said additional coupler and from at least one of said plurality of couplers,
    producing an error signal indicative of the differences between the signals produced by said additional coupler and said one of said plurality of couplers and
    determining from the magnitude of said error signal the condition of said one of said plurality of couplers.

5. The method defined in claim 4 comprising the further step of:
    disabling said one of said plurality of couplers responsive to a predetermined magnitude of said error signal.

6. The method defined in claim 5 comprising the further step of:
    substituting said additional coupler for the one of said plurality of couplers which is disabled.

* * * * *